US011828062B2

(12) United States Patent
Chich et al.

(10) Patent No.: US 11,828,062 B2
(45) Date of Patent: Nov. 28, 2023

(54) UNDERLAYMENTS FOR STEEP SLOPE ROOF SUBSTRATES AND RELATED METHODS

(71) Applicant: BMIC LLC, Dallas, TX (US)

(72) Inventors: Adem Chich, Kearny, NJ (US); Wilson Cheung, Hillsborough, NJ (US); Kihyun Kim, Hackensack, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/959,995

(22) Filed: Oct. 4, 2022

(65) Prior Publication Data

US 2023/0042918 A1 Feb. 9, 2023

Related U.S. Application Data

(63) Continuation of application No. 17/545,774, filed on Dec. 8, 2021, now Pat. No. 11,486,138.

(60) Provisional application No. 63/124,369, filed on Dec. 11, 2020.

(51) Int. Cl.
| | |
|---|---|
| *E04B 1/94* | (2006.01) |
| *C08K 3/32* | (2006.01) |
| *C09D 133/08* | (2006.01) |
| *C09D 5/18* | (2006.01) |
| *B05D 1/02* | (2006.01) |
| *C08K 3/22* | (2006.01) |
| *C08K 3/30* | (2006.01) |
| *E04D 5/06* | (2006.01) |
| *E04B 1/66* | (2006.01) |

(52) U.S. Cl.
CPC ............ *E04B 1/948* (2013.01); *B05D 1/02* (2013.01); *C08K 3/22* (2013.01); *C08K 3/30* (2013.01); *C08K 3/32* (2013.01); *C09D 5/18* (2013.01); *C09D 133/08* (2013.01); *E04B 1/665* (2013.01); *E04D 5/06* (2013.01); *B05D 2202/15* (2013.01); *B05D 2401/20* (2013.01); *B05D 2502/00* (2013.01); *C08K 2003/2227* (2013.01); *C08K 2003/3081* (2013.01); *C08K 2003/324* (2013.01)

(58) Field of Classification Search
CPC .......... E04B 1/948; E04B 1/665; B05D 1/02; B05D 2202/15; B05D 2401/20; B05D 2502/00; C08K 3/22; C08K 3/30; C08K 3/32; C08K 2003/2227; C08K 2003/3081; C08K 2003/324; C09D 5/18; C09D 133/08; E04D 5/06

USPC ........................................................ 252/601
See application file for complete search history.

(56) References Cited

U.S. PATENT DOCUMENTS

| | | |
|---|---|---|
| 3,967,032 A | 6/1976 | Plotz et al. |
| 9,303,145 B2 | 4/2016 | Markgraf et al. |
| 9,994,670 B2 | 6/2018 | Rukavina |
| 10,704,254 B2 | 7/2020 | Seabaugh et al. |
| 2003/0124932 A1 | 7/2003 | Droux |
| 2004/0127120 A1 | 7/2004 | Zanchetta et al. |
| 2005/0261407 A1* | 11/2005 | Khan ............... C09D 5/004 524/425 |
| 2007/0137130 A1 | 6/2007 | Zickell et al. |
| 2010/0178827 A1 | 7/2010 | Thai et al. |
| 2012/0077010 A1 | 3/2012 | Manesis et al. |
| 2012/0160414 A1 | 6/2012 | Pampanas et al. |
| 2013/0102718 A1 | 4/2013 | Markgraf et al. |
| 2013/0331488 A1 | 12/2013 | Markgraf et al. |
| 2014/0259972 A1 | 9/2014 | Feuer et al. |
| 2015/0125684 A1 | 5/2015 | Ando et al. |
| 2015/0315413 A1 | 11/2015 | Diggins |
| 2016/0257809 A1 | 9/2016 | Biondini et al. |
| 2017/0037263 A1* | 2/2017 | Iyer ..................... C09D 5/02 |
| 2017/0173916 A1 | 6/2017 | Widenbrant et al. |
| 2017/0291384 A1 | 6/2017 | Hyer et al. |
| 2017/0275494 A1 | 9/2017 | Jahns et al. |
| 2018/0237662 A1 | 8/2018 | Widenbrant et al. |
| 2019/0382622 A1 | 12/2019 | Seabaugh et al. |
| 2020/0224409 A1 | 7/2020 | Chich et al. |

FOREIGN PATENT DOCUMENTS

| | | |
|---|---|---|
| KR | 10-2000-0040776 A | 7/2000 |
| WO | 2017-162641 A1 | 9/2017 |

* cited by examiner

*Primary Examiner* — Hui H Chin
(74) *Attorney, Agent, or Firm* — GREENBERG TRAURIG, LLP

(57) ABSTRACT

Some embodiments of the present disclosure relate to a method comprising: obtaining a base formulation, obtaining an activator formulation, mixing the base formulation with the activator formulation, so as to result in a liquid applied roofing formulation, applying the liquid applied roofing formulation to at least one steep slope roof substrate, and solidifying the formulation, so as to form at least one coating layer on the at least one steep slope roof substrate. Some embodiments of the present disclosure relate to a liquid applied roofing formulation comprising a first part and a second part. In some embodiments, the first part comprises the base formulation and the second part comprises the activator formulation.

8 Claims, No Drawings

UNDERLAYMENTS FOR STEEP SLOPE ROOF SUBSTRATES AND RELATED METHODS

RELATED APPLICATIONS

The present application is a continuation of U.S. patent application Ser. No. 17/545,774, filed Dec. 8, 2021, which claims the benefit of U.S. Provisional Application No. 63/124,369, filed Dec. 11, 2020, the contents of which are incorporated herein by reference in their entirety for all purposes.

FIELD

The present disclosure relates to a liquid applied roofing formation and a method of applying the same to at least one steep slope roof substrate.

BACKGROUND

Many current roofing products such as roofing underlayments, may be adequate as ice and water barriers. However, at least some roofing underlayments may have limited breathability and may potentially cause moisture issues. In addition, some roofing underlayments may contain failure areas, such as, but not limited to overlaps, seams, and roofing fasteners.

Formulations and methods that address at least the above issues, while preserving existing advantages of current roofing products (such as, but not limited to, fire resistance and nail sealability) are therefore needed.

SUMMARY

Some embodiments of the present disclosure relate to a method comprising: obtaining a base formulation, obtaining an activator formulation, mixing the base formulation with the activator formulation, so as to result in a liquid applied roofing formulation, applying the liquid applied roofing formulation to at least one steep slope roof substrate and solidifying the formulation, so as to form at least one coating layer on the at least one steep slope roof substrate.

In some embodiments, the base formulation comprises at least one flame retardant, at least one acrylic polymer, and water. In some embodiments, the base formulation has a viscosity of 4000 cP or less measured according to ASTM D2196 using a RV3 viscometer spindle at 50 rpm and 23° C. and Some embodiments of the present disclosure relate to a liquid applied roofing formulation comprising a first part and a second part. In some embodiments, the first part of the liquid applied roofing formulation is the base formulation. In some embodiments, the second part of the liquid applied roofing formulation is the activator formulation.

Covered embodiments are defined by the claims, not the above summary. The above summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

DETAILED DESCRIPTION

Some embodiments of the present disclosure relate to methods of using a liquid applied roofing formulation. As used herein, a "liquid applied roofing formulation" is any formulation that can be applied to a steep slope roof substrate in liquid form, such as but not limited to by spraying, coating, painting, or any combination thereof. A "liquid applied roofing formulation" includes, but is not limited to, any liquid applied roof coating described in US Patent Application Publication No. 20200224409, titled "Liquid Applied Roofing System with Improved Moisture Barrier Layer," the entirety of which is incorporated herein by reference for all purposes. In some embodiments, "liquid applied roofing formulation" has a viscosity range specified herein.

In some embodiments, the method of using the liquid applied roofing formulation comprises obtaining a base formulation.

In some embodiments, the base formulation comprises at least one acrylic polymer.

In some embodiments, the at least one acrylic polymer comprises poly(methyl methacrylate) (PMMA), polyacrylonitrile (PAN), poly(hydroxyethyl methacrylate, poly(glyceryl methacrylate), poly(ethyl methacrylate), poly(isobutyl methacrylate), poly(acrylic acid), poly(α-methyl cyanoacrylate), an acrylic latex resin, acrylic-polyvinyl chloride (acrylic-PVC), acrylic-styrene, isobornyl methacrylate, isobornyl acrylate, ethyl methacrylate, isobutyl methacrylate, n-butyl methacrylate, ethyl acrylate, n-butyl acrylate, 2-hexyl ethyl acrylate or any combination thereof.

In some embodiments, the at least one acrylic polymer is present in the base formulation in an amount ranging from 1% to 99%. In some embodiments, the at least one acrylic polymer is present in the base formulation in an amount ranging from 10% to 99%. In some embodiments, the at least one acrylic polymer is present in the base formulation in an amount ranging from 1% to 99%. In some embodiments, the at least one acrylic polymer is present in the base formulation in an amount ranging from 20% to 99%. In some embodiments, the at least one acrylic polymer is present in the base formulation in an amount ranging from 30% to 99%. In some embodiments, the at least one acrylic polymer is present in the base formulation in an amount ranging from 40% to 99%. In some embodiments, the at least one acrylic polymer is present in the base formulation in an amount ranging from 50% to 99%. In some embodiments, the at least one acrylic polymer is present in the base formulation in an amount ranging from 60% to 99%. In some embodiments, the at least one acrylic polymer is present in the base formulation in an amount ranging from 70% to 99%. In some embodiments, the at least one acrylic polymer is present in the base formulation in an amount ranging from 80% to 99%. In some embodiments, the at least one acrylic polymer is present in the base formulation in an amount ranging from 90% to 99%.

In some embodiments, the at least one acrylic polymer is present in the base formulation in an amount ranging from 1% to 90%. In some embodiments, the at least one acrylic polymer is present in the base formulation in an amount ranging from 1% to 80%. In some embodiments, the at least one acrylic polymer is present in the base formulation in an amount ranging from 1% to 70%. In some embodiments, the at least one acrylic polymer is present in the base formulation in an amount ranging from 1% to 60%. In some embodiments, the at least one acrylic polymer is present in the base formulation in an amount ranging from 1% to 50%. In some embodiments, the at least one acrylic polymer is present in the base formulation in an amount ranging from 1% to 40%. In some embodiments, the at least one acrylic polymer is present in the base formulation in an amount ranging from 1% to 30%. In some embodiments, the at least one acrylic polymer is present in the base formulation in an amount ranging from 1% to 20%. In some embodiments, the at least one acrylic polymer is present in the base formulation in an amount ranging from 1% to 10%.

In some embodiments, the at least one acrylic polymer is present in the base formulation in an amount ranging from 10% to 90%. In some embodiments, the at least one acrylic polymer is present in the base formulation in an amount ranging from 20% to 80%. In some embodiments, the at least one acrylic polymer is present in the base formulation in an amount ranging from 30% to 70%. In some embodiments, the at least one acrylic polymer is present in the base formulation in an amount ranging from 40% to 60%.

In some embodiments, the at least one acrylic polymer is present in the base formulation in an amount ranging from 15% to 40%. In some embodiments, the at least one acrylic polymer is present in the base formulation in an amount ranging from 20% to 40%. In some embodiments, the at least one acrylic polymer is present in the base formulation in an amount ranging from 25% to 40%. In some embodiments, the at least one acrylic polymer is present in the base formulation in an amount ranging from 30% to 40%. In some embodiments, the at least one acrylic polymer is present in the base formulation in an amount ranging from 35% to 40%.

In some embodiments, the at least one acrylic polymer is present in the base formulation in an amount ranging from 15% to 35%. In some embodiments, the at least one acrylic polymer is present in the base formulation in an amount ranging from 15% to 30%. In some embodiments, the at least one acrylic polymer is present in the base formulation in an amount ranging from 15% to 25%. In some embodiments, the at least one acrylic polymer is present in the base formulation in an amount ranging from 15% to 20%.

In some embodiments, the at least one acrylic polymer is present in the base formulation in an amount ranging from 20% to 35%. In some embodiments, the at least one acrylic polymer is present in the base formulation in an amount ranging from 25% to 30%.

In some embodiments, the at least one acrylic polymer is added to the base formulation as a mixture. In some embodiments, the mixture is a dispersion that comprises the at least one acrylic polymer and water. In some embodiments, the mixture that comprises the acrylic polymer comprises a specified percentage of solids.

In some embodiments, the specified percentage of solids is from 40% to 60% solids. In some embodiments, the specified percentage of solids is from 45% to 60% solids. In some embodiments, the specified percentage of solids is from 50% to 60% solids. In some embodiments, the specified percentage of solids is from 55% to 60% solids.

In some embodiments, the specified percentage of solids is from 40% to 55% solids. In some embodiments, the specified percentage of solids is from 40% to 50% solids. In some embodiments, the specified percentage of solids is from 40% to 45% solids.

In some embodiments, the specified percentage of solids is from 45% to 55% solids.

In some embodiments, the base formulation further comprises at least one flame retardant.

In some embodiments, the at least one flame retardant comprises colemanite, aluminum trihydrate (ATH), magnesium hydroxide, expandable graphite, ammonium polyphosphate, triphenyl phosphate, resorcinol bis(diphenylphosphate), bisphenol A diphenyl phosphate, tricresyl phosphate, dimethyl methylphosphonate, aluminium diethyl phosphinate, decabromodiphenyl ether, decabromodiphenyl ethane, at least one brominated polystyrene, at least one brominated carbonate oligomer, at least one brominated epoxy oligomer, tetrabromophthalic anyhydride, tetrabromobisphenol A, hexabromocyclododecane, antimony trioxide, antimony pentoxide, at least one chlorinated paraffin, huntite, hydromagnesite, red phosphorous, zinc borate, sodium borate, lithium borate, boric acid, tris(1,3-dichloro-2-propyl)phosphate, (tetrakis(2-chlorethyl)dichloroisopentyldiphosphate, or any combination thereof.

In some embodiments, the at least one flame retardant is present in an amount ranging from 1 wt % to 99 wt % based on a total weight of the base formulation. In some embodiments, the at least one flame retardant is present in an amount ranging from 10 wt % to 99 wt % based on a total weight of the base formulation. In some embodiments, the at least one flame retardant is present in an amount ranging from 20 wt % to 99 wt % based on a total weight of the base formulation. In some embodiments, the at least one flame retardant is present in an amount ranging from 30 wt % to 99 wt % based on a total weight of the base formulation. In some embodiments, the at least one flame retardant is present in an amount ranging from 40 wt % to 99 wt % based on a total weight of the base formulation. In some embodiments, the at least one flame retardant is present in an amount ranging from 50 wt % to 99 wt % based on a total weight of the base formulation. In some embodiments, the at least one flame retardant is present in an amount ranging from 60 wt % to 99 wt % based on a total weight of the base formulation. In some embodiments, the at least one flame retardant is present in an amount ranging from 70 wt % to 99 wt % based on a total weight of the base formulation. In some embodiments, the at least one flame retardant is present in an amount ranging from 80 wt % to 99 wt % based on a total weight of the base formulation. In some embodiments, the at least one flame retardant is present in an amount ranging from 90 wt % to 99 wt % based on a total weight of the base formulation.

In some embodiments, the at least one flame retardant is present in an amount ranging from 1 wt % to 90 wt % based on a total weight of the base formulation. In some embodiments, the at least one flame retardant is present in an amount ranging from 1 wt % to 80 wt % based on a total weight of the base formulation. In some embodiments, the at least one flame retardant is present in an amount ranging from 1 wt % to 70 wt % based on a total weight of the base formulation. In some embodiments, the at least one flame retardant is present in an amount ranging from 1 wt % to 60 wt % based on a total weight of the base formulation. In some embodiments, the at least one flame retardant is present in an amount ranging from 1 wt % to 50 wt % based on a total weight of the base formulation. In some embodiments, the at least one flame retardant is present in an amount ranging from 1 wt % to 40 wt % based on a total weight of the base formulation. In some embodiments, the at least one flame retardant is present in an amount ranging from 1 wt % to 30 wt % based on a total weight of the base formulation. In some embodiments, the at least one flame retardant is present in an amount ranging from 1 wt % to 20 wt % based on a total weight of the base formulation. In some embodiments, the at least one flame retardant is present in an amount ranging from 1 wt % to 10 wt % based on a total weight of the base formulation.

In some embodiments, the at least one flame retardant is present in an amount ranging from 10 wt % to 90 wt % based on a total weight of the base formulation. In some embodiments, the at least one flame retardant is present in an amount ranging from 20 wt % to 80 wt % based on a total weight of the base formulation. In some embodiments, the at least one flame retardant is present in an amount ranging from 30 wt % to 70 wt % based on a total weight of the base formulation. In some embodiments, the at least one flame retardant is present in an amount ranging from 40 wt % to 60 wt % based on a total weight of the base formulation.

In some embodiments, the at least one flame retardant is present in an amount ranging from 15 wt % to 20 wt % based on a total weight of the base formulation. In some embodiments, the at least one flame retardant is present in an amount ranging from 16 wt % to 20 wt % based on a total weight of the base formulation. In some embodiments, the at least one flame retardant is present in an amount ranging from 17 wt % to 20 wt % based on a total weight of the base formulation. In some embodiments, the at least one flame retardant is present in an amount ranging from 18 wt % to 20 wt % based on a total weight of the base formulation. In some embodiments, the at least one flame retardant is present in an amount ranging from 19 wt % to 20 wt % based on a total weight of the base formulation.

In some embodiments, the at least one flame retardant is present in an amount ranging from 15 wt % to 19 wt % based on a total weight of the base formulation. In some embodiments, the at least one flame retardant is present in an amount ranging from 15 wt % to 18 wt % based on a total weight of the base formulation. In some embodiments, the at least one flame retardant is present in an amount ranging from 15 wt % to 17 wt % based on a total weight of the base formulation. In some embodiments, the at least one flame retardant is present in an amount ranging from 15 wt % to 16 wt % based on a total weight of the base formulation.

In some embodiments, the at least one flame retardant is present in an amount ranging from 16 wt % to 19 wt % based on a total weight of the base formulation. In some embodiments, the at least one flame retardant is present in an amount ranging from 17 wt % to 19 wt % based on a total weight of the base formulation. In some embodiments, the at least one flame retardant is present in an amount ranging from 18 wt % to 19 wt % based on a total weight of the base formulation.

In some embodiments, the at least one flame retardant is present in an amount ranging from 16 wt % to 18 wt % based on a total weight of the base formulation.

In some embodiments, the base formulation further comprises water.

In some embodiments, the water is present in the base formulation in an amount of 1 wt % to 50 wt % based on a total weight of the base formulation. In some embodiments, the water is present in the base formulation in an amount of 10 wt % to 50 wt % based on a total weight of the base formulation. In some embodiments, the water is present in the base formulation in an amount of 20 wt % to 50 wt % based on a total weight of the base formulation. In some embodiments, the water is present in the base formulation in an amount of 30 wt % to 50 wt % based on a total weight of the base formulation. In some embodiments, the water is present in the base formulation in an amount of 40 wt % to 50 wt % based on a total weight of the base formulation.

In some embodiments, the water is present in the base formulation in an amount of 1 wt % to 40 wt % based on a total weight of the base formulation. In some embodiments, the water is present in the base formulation in an amount of 1 wt % to 30 wt % based on a total weight of the base formulation. In some embodiments, the water is present in the base formulation in an amount of 1 wt % to 30 wt % based on a total weight of the base formulation. In some embodiments, the water is present in the base formulation in an amount of 1 wt % to 20 wt % based on a total weight of the base formulation. In some embodiments, the water is present in the base formulation in an amount of 1 wt % to 10 wt % based on a total weight of the base formulation.

In some embodiments, the water is present in the base formulation in an amount of 10 wt % to 40 wt % based on a total weight of the base formulation. In some embodiments, the water is present in the base formulation in an amount of 20 wt % to 30 wt % based on a total weight of the base formulation.

In some embodiments, the water is present in the base formulation in an amount of 2 wt % to 10 wt % based on a total weight of the base formulation. In some embodiments, the water is present in the base formulation in an amount of 3 wt % to 10 wt % based on a total weight of the base formulation. In some embodiments, the water is present in the base formulation in an amount of 4 wt % to 10 wt % based on a total weight of the base formulation. In some embodiments, the water is present in the base formulation in an amount of 5 wt % to 10 wt % based on a total weight of the base formulation. In some embodiments, the water is present in the base formulation in an amount of 6 wt % to 10 wt % based on a total weight of the base formulation. In some embodiments, the water is present in the base formulation in an amount of 7 wt % to 10 wt % based on a total weight of the base formulation. In some embodiments, the water is present in the base formulation in an amount of 8 wt % to 10 wt % based on a total weight of the base formulation. In some embodiments, the water is present in the base formulation in an amount of 9 wt % to 10 wt % based on a total weight of the base formulation.

In some embodiments, the water is present in the base formulation in an amount of 2 wt % to 9 wt % based on a total weight of the base formulation. In some embodiments, the water is present in the base formulation in an amount of 2 wt % to 8 wt % based on a total weight of the base formulation. In some embodiments, the water is present in the base formulation in an amount of 2 wt % to 7 wt % based on a total weight of the base formulation. In some embodiments, the water is present in the base formulation in an amount of 2 wt % to 6 wt % based on a total weight of the base formulation. In some embodiments, the water is present in the base formulation in an amount of 2 wt % to 5 wt % based on a total weight of the base formulation. In some embodiments, the water is present in the base formulation in an amount of 2 wt % to 4 wt % based on a total weight of the base formulation. In some embodiments, the water is present in the base formulation in an amount of 2 wt % to 3 wt % based on a total weight of the base formulation.

In some embodiments, the water is present in the base formulation in an amount of 3 wt % to 9 wt % based on a total weight of the base formulation. In some embodiments, the water is present in the base formulation in an amount of 4 wt % to 9 wt % based on a total weight of the base formulation. In some embodiments, the water is present in the base formulation in an amount of 5 wt % to 9 wt % based on a total weight of the base formulation. In some embodiments, the water is present in the base formulation in an amount of 6 wt % to 9 wt % based on a total weight of the base formulation. In some embodiments, the water is present in the base formulation in an amount of 7 wt % to 9 wt % based on a total weight of the base formulation. In some embodiments, the water is present in the base formulation in an amount of 8 wt % to 9 wt % based on a total weight of the base formulation.

In some embodiments, the base formulation has a specific predetermined viscosity. As used herein, viscosity is measured according to ASTM D2196 using a RV3 viscometer spindle at 50 rpm and 23° C.

In some embodiments, the base formulation has a viscosity of 15,000 cP or less measured according to ASTM D2196 using a RV3 viscometer spindle at 50 rpm and 23° C. In some embodiments, the base formulation has a viscosity of 10,000 cP or less measured according to ASTM D2196 using a RV3 viscometer spindle at 50 rpm and 23° C. In some embodiments, the base formulation has a viscosity of 5,000 cP or less measured according to ASTM D2196 using a RV3 viscometer spindle at 50 rpm and 23° C. In some embodiments, the base formulation has a viscosity of 1,000 cP or less measured according to ASTM D2196 using a RV3 viscometer spindle at 50 rpm and 23° C. In some embodiments, the base formulation has a viscosity of 900 cP or less measured according to ASTM D2196 using a RV3 viscometer spindle at 50 rpm and 23° C. In some embodiments, the base formulation has a viscosity of 800 cP or less measured according to ASTM D2196 using a RV3 viscometer spindle at 50 rpm and 23° C. In some embodiments, the base formulation has a viscosity of 700 cP or less measured according to ASTM D2196 using a RV3 viscometer spindle at 50 rpm and 23° C. In some embodiments, the base formulation has a viscosity of 600 cP or less measured according to ASTM D2196 using a RV3 viscometer spindle at 50 rpm and 23° C. In some embodiments, the base formulation has a viscosity of 500 cP or less measured according to ASTM D2196 using a RV3 viscometer spindle at 50 rpm and 23° C. In some embodiments, the base formulation has a viscosity of 400 cP or less measured according to ASTM D2196 using a RV3 viscometer spindle at 50 rpm and 23° C. In some embodiments, the base formulation has a viscosity of 300 cP or less measured according to ASTM D2196 using a RV3 viscometer spindle at 50 rpm and 23° C. In some embodiments, the base formulation has a viscosity of 230 cP or less measured according to ASTM D2196 using a RV3 viscometer spindle at 50 rpm and 23° C. In some embodiments, the base formulation has a viscosity of 100 cP or less measured according to ASTM D2196 using a RV3 viscometer spindle at 50 rpm and 23° C.

In some embodiments, the base formulation has a viscosity of 100 cP to 15,000 cP measured according to ASTM D2196 using a RV3 viscometer spindle at 50 rpm and 23° C. In some embodiments, the base formulation has a viscosity of 230 cP to 15,000 cP measured according to ASTM D2196 using a RV3 viscometer spindle at 50 rpm and 23° C. In some embodiments, the base formulation has a viscosity of 300 cP to 15,000 cP measured according to ASTM D2196 using a RV3 viscometer spindle at 50 rpm and 23° C. In some embodiments, the base formulation has a viscosity of 300 cP to 15,000 cP measured according to ASTM D2196 using a RV3 viscometer spindle at 50 rpm and 23° C. In some embodiments, the base formulation has a viscosity of 400 cP to 15,000 cP measured according to ASTM D2196 using a RV3 viscometer spindle at 50 rpm and 23° C. In some embodiments, the base formulation has a viscosity of 500 cP to 15,000 cP measured according to ASTM D2196 using a RV3 viscometer spindle at 50 rpm and 23° C. In some embodiments, the base formulation has a viscosity of 600 cP to 15,000 cP measured according to ASTM D2196 using a RV3 viscometer spindle at 50 rpm and 23° C. In some embodiments, the base formulation has a viscosity of 700 cP to 15,000 cP measured according to ASTM D2196 using a RV3 viscometer spindle at 50 rpm and 23° C. In some embodiments, the base formulation has a viscosity of 800 cP to 15,000 cP measured according to ASTM D2196 using a RV3 viscometer spindle at 50 rpm and 23° C. In some embodiments, the base formulation has a viscosity of 900 cP to 15,000 cP measured according to ASTM D2196 using a RV3 viscometer spindle at 50 rpm and 23° C. In some embodiments, the base formulation has a viscosity of 1000 cP to 15,000 cP measured according to ASTM D2196 using a RV3 viscometer spindle at 50 rpm and 23° C. In some embodiments, the base formulation has a viscosity of 5,000 cP to 15,000 cP measured according to ASTM D2196 using a RV3 viscometer spindle at 50 rpm and 23° C. In some embodiments, the base formulation has a viscosity of 10,000 cP to 15,000 cP measured according to ASTM D2196 using a RV3 viscometer spindle at 50 rpm and 23° C.

In some embodiments, the base formulation has a viscosity of 100 cP to 10,000 cP measured according to ASTM D2196 using a RV3 viscometer spindle at 50 rpm and 23° C. In some embodiments, the base formulation has a viscosity of 100 cP to 5,000 cP measured according to ASTM D2196 using a RV3 viscometer spindle at 50 rpm and 23° C. In some embodiments, the base formulation has a viscosity of 100 cP to 1,000 cP measured according to ASTM D2196 using a RV3 viscometer spindle at 50 rpm and 23° C. In some embodiments, the base formulation has a viscosity of 100 cP to 900 cP measured according to ASTM D2196 using a RV3 viscometer spindle at 50 rpm and 23° C. In some embodiments, the base formulation has a viscosity of 100 cP to 800 cP measured according to ASTM D2196 using a RV3 viscometer spindle at 50 rpm and 23° C. In some embodiments, the base formulation has a viscosity of 100 cP to 700 cP measured according to ASTM D2196 using a RV3 viscometer spindle at 50 rpm and 23° C. In some embodiments, the base formulation has a viscosity of 100 cP to 600 cP measured according to ASTM D2196 using a RV3 viscometer spindle at 50 rpm and 23° C. In some embodiments, the base formulation has a viscosity of 100 cP to 500 cP measured according to ASTM D2196 using a RV3 viscometer spindle at 50 rpm and 23° C. In some embodiments, the base formulation has a viscosity of 100 cP to 400 cP measured according to ASTM D2196 using a RV3 viscometer spindle at 50 rpm and 23° C. In some embodiments, the base formulation has a viscosity of 100 cP to 300 cP measured according to ASTM D2196 using a RV3 viscometer spindle at 50 rpm and 23° C. In some embodiments, the base formulation has a viscosity of 100 cP to 230 cP measured according to ASTM D2196 using a RV3 viscometer spindle at 50 rpm and 23° C.

In some embodiments, the base formulation has a viscosity of 230 cP to 10,000 cP measured according to ASTM D2196 using a RV3 viscometer spindle at 50 rpm and 23° C. In some embodiments, the base formulation has a viscosity of 300 cP to 5000 cP measured according to ASTM D2196 using a RV3 viscometer spindle at 50 rpm and 23° C. In some embodiments, the base formulation has a viscosity of 400 cP to 1000 cP measured according to ASTM D2196 using a RV3 viscometer spindle at 50 rpm and 23° C. In some embodiments, the base formulation has a viscosity of 500 cP to 900 cP measured according to ASTM D2196 using a RV3 viscometer spindle at 50 rpm and 23° C. In some embodiments, the base formulation has a viscosity of 600 cP to 800 cP measured according to ASTM D2196 using a RV3 viscometer spindle at 50 rpm and 23° C.

In some embodiments, the method of using the liquid applied roofing formulation further comprises obtaining an activator formulation. As used herein, an activator formulation is a formulation that upon mixing with the base formulation in a sufficient amount, speeds up solidification of a resulting liquid applied roofing formulation on at least one roof substrate, relative to an otherwise equivalent formulation where no activator formulation is present.

In some embodiments, the sufficient amount of the activator formulation that is mixed with the base formulation is a weight ratio of the activator formulation to the base formulation ranging from 1:100 to 1:5. In some embodiments, the sufficient amount of the activator formulation that is mixed with the base formulation is a weight ratio of the activator formulation to the base formulation ranging from 1:50 to 1:5. In some embodiments, the sufficient amount of the activator formulation that is mixed with the base formulation is a weight ratio of the activator formulation to the base formulation ranging from 1:25 to 1:5. In some embodiments, the sufficient amount of the activator formulation that is mixed with the base formulation is a weight ratio of the activator formulation to the base formulation ranging from 1:10 to 1:5.

In some embodiments, the sufficient amount of the activator formulation that is mixed with the base formulation is a weight ratio of the activator formulation to the base formulation ranging from 1:100 to 1:10. In some embodiments, the sufficient amount of the activator formulation that is mixed with the base formulation is a weight ratio of the activator formulation to the base formulation ranging from 1:100 to 1:25. In some embodiments, the sufficient amount of the activator formulation that is mixed with the base formulation is a weight ratio of the activator formulation to the base formulation ranging from 1:100 to 1:50.

In some embodiments, the sufficient amount of the activator formulation that is mixed with the base formulation is a weight ratio of the activator formulation to the base formulation ranging from 1:50 to 1:10. In some embodiments, the sufficient amount of the activator formulation that is mixed with the base formulation is a weight ratio of the activator formulation to the base formulation ranging from 1:25 to 1:10. In some embodiments, the sufficient amount of the activator formulation that is mixed with the base formulation is a weight ratio of the activator formulation to the base formulation ranging from 1:25 to 1:50.

In some embodiments, the activator formulation comprises at least one flocculant. In some embodiments the at least one flocculant comprises at least one inorganic metal salt. In some embodiments, the at least one inorganic metal salt comprises, consists of, or consists essentially of aluminum sulfate. In some embodiments, the activator formulation comprises at least one desiccant. In some embodiments, the activator formulation comprises at least one liquid carrier. In some embodiments, the at least one liquid carrier comprises water, at least one non-aqueous liquid carrier, or any combination thereof.

In some embodiments, the base formulation, the activator formulation, or any combination thereof further comprises at least one pigment, at least one flocculant, at least one desiccant, at least one film formation additive, at least one functional filler, at least one rheology modifier, at least one crosslinker, or any combination thereof. In some embodiments, the at least one pigment may comprise any insoluble particle used to impart color. In some embodiments, the at least one pigment may comprise finely ground natural particles, finely ground synthetic particles, or any combination thereof. In some embodiments, the at least one pigment may comprise, titanium oxide, zinc oxide, or any combination thereof. In some embodiments, the at least one desiccant may comprise at least one calcium oxide, Portland cement, calcium silicate hydrate, or any combination thereof. In some embodiments, the at least one flocculant may comprise, at least one charged polymer, at least one multivalent metal salt (such as, but not limited to, aluminum sulfate), or any combination thereof. In some embodiments, the at least one film formation additive may include, but is not limited to, a hydrophobic film formation additive, a hydrophilic film formation additive, a partially water-soluble film formation additive, or any combination thereof. Examples of at least one film formation additive that may be suitable for some embodiments of the present disclosure include, but are not limited to, at least one hydrophobic film formation additive, at least one hydrophilic film formation additive, at least one partially water soluble, film formation additive, or any combination thereof. Specific examples of at least one film formation additive that may be suitable for some embodiments of the present disclosure include, but are not limited to, volatile solvents such as, but not limited to, dipropylene glycol n-butyl ether (DPnB) or 2,2,4-trimethyl-1,3-pentanediol monoisobutyrate (Eastman Texanol™ Ester solvent, 2323NPR, hereinafter "Texanol"), Loxanol® CA 5310 and Efka® PL 5651 from BASF Corporation, Eastman Optifilm™ Enhancer 400 from Eastman Chemical Company, (hereinafter, Optifilm 400), or any combination thereof. In some embodiments, a film formation additive may be referred to as a "coalescent agent." In some embodiments, the at least one functional filler may include, but is not limited to, at least one silicate mineral, wollastonite, talc, mica, kaolin, feldspar, and nepheline syenite, at least one surface treated filler, at least one sub-micron filler at least one hydrophobic filler, at least one nano-filler, or any combination thereof. Non-limiting examples of the at least one sub-micron filler may include, but are not limited to, at least one nanoclay, at least one platy filler, at least one nano-oxide, or any combination thereof. Non-limiting examples of the at least one surface treated filler includes, but is not limited to, at least one calcium carbonate (e.g., Imerys Camel-Wite ST) and aluminum trihydrate (such as but not limited to Huber Hymod® Micral® grade, Hymod® M9400 SG—surface treated grade, or any combination thereof). Non-limiting examples of at the at least one hydrophobic filler include, but are not limited to Novakup® platy silica. Non-limiting examples of the at least one nano-filler include, but are not limited to, treated fumed silicas, untreated fumed silicas (e.g., Evonik® Areosil hydrophilic and hydrophobic grades), Oxylink™ pre-dispersed nano $ZnO_2$ micronizer, at least one nano-kaolin clay, at least one bentonite clay, at least one, monomonilorite clay, or any combination thereof. In some embodiments, the at least one functional filler may be used to enhance film properties such as, but not limited to, tensile and adhesion properties. Examples of the at least one crosslinker include carbodiimide (e.g., Carbodilite series from Nisshinbo Chemical/GSI Exim America), at least one water stable epoxy silane (e.g. Momentive Coatosil 2287), or any combination thereof. Non-limiting examples of the at least one rheology modifier include, but are not limited to, HUER (i.e., at least one nonionic polyurethane associative thickener), Acrysol™ Rm-12w, 8W, 2323, 995, Dow™ Rheolate series, RM-12w, RM-995, RM-8W, or any combination thereof.

In some embodiments, the method of using the liquid applied roofing formulation further comprises mixing the base formulation with the activator formulation. In some embodiments, mixing the base formulation with the activator formulation comprises mixing the base formulation with the activator formulation within the at least one applicator device.

In some embodiments, mixing the base formulation with the activator formulation results in the liquid applied roofing formulation.

In some embodiments, the method of using the liquid applied roofing formulation further comprises applying the liquid applied roofing formulation to at least one steep slope roof substrate. As defined herein, a "steep slope roof substrate" is any roof substrate that is disposed on a roof having a pitch of Y/X, where Y and X are in a ratio of 4:12 to 12:12, where Y corresponds to the "rise" of the roof, and where X corresponds to the "run" of the roof.

In some embodiments, Y and X are in a ratio of 5:12 to 12:12. In some embodiments, Y and X are in a ratio of 6:12 to 12:12. In some embodiments, Y and X are in a ratio of 7:12 to 12:12. In some embodiments, Y and X are in a ratio of 6:12 to 12:12. In some embodiments, Y and X are in a ratio of 8:12 to 12:12. In some embodiments, Y and X are in a ratio of 6:12 to 12:12. In some embodiments, Y and X are in a ratio of 9:12 to 12:12. In some embodiments, Y and X are in a ratio of 10:12 to 12:12. In some embodiments, Y and X are in a ratio of 11:12 to 12:12.

In some embodiments, Y and X are in a ratio of 4:12 to 11:12. In some embodiments, Y and X are in a ratio of 4:12 to 10:12. In some embodiments, Y and X are in a ratio of 4:12 to 9:12. In some embodiments, Y and X are in a ratio of 4:12 to 8:12. In some embodiments, Y and X are in a ratio of 4:12 to 7:12. In some embodiments, Y and X are in a ratio of 4:12 to 6:12. In some embodiments, Y and X are in a ratio of 4:12 to 5:12.

In some embodiments, Y and X are in a ratio of 5:12 to 11:12. In some embodiments, Y and X are in a ratio of 6:12 to 10:12. In some embodiments, Y and X are in a ratio of 7:12 to 9:12.

In some embodiments, mixing the base formulation with the activator formulation comprises pre-mixing at least some of the base formulation with at least some of the activator formulation prior to applying the liquid applied roofing formulation to the at least one steep slope roof substrate. In some embodiments, mixing the base formulation with the activator formulation comprises pre-mixing all of the base formulation with all of the activator formulation prior to applying the liquid applied roofing formulation to the at least one steep slope roof substrate.

In some embodiments, the base formulation is mixed with the activator formulation by impingement, outside of at least one mixing device (e.g., an applicator device), prior to application of the resulting liquid applied roofing formulation on at least one steep slope roof substrate.

In some embodiments, the at least one steep slope roof substrate comprises a plywood substrate, a glass substrate, a fiberglass substrate, (e.g., a fiberglass mat), a cellulosic substrate, an underlayment, a roofing membrane (e.g., a thermoplastic polyolefin (TPO) or polyvinyl chloride (PVC) membrane), a roof deck, a photovoltaic (PV) panel, a modified bitumen (MODBIT) substrate, a roll good, or any combination thereof.

In some embodiments, the at least one steep slope roof substrate comprises a roof deck.

In some embodiments, the base formulation, the activator formulation, the liquid applied roofing formulation, or any combination thereof is applied directly to the roof deck. In some embodiments, the activator formulation, the liquid applied roofing formulation, or any combination thereof is applied onto a second roof substrate that is present on the roof deck.

In some embodiments, the liquid applied roofing formulation is applied to the at least one steep slope roof substrate in a single stage.

In some embodiments, liquid applied roofing formulation is applied to the at least one steep slope roof substrate in multiple stages. In some embodiments, liquid applied roofing formulation is applied to the at least one steep slope roof substrate in two stages. In some embodiments, liquid applied roofing formulation is applied to the at least one steep slope roof substrate in three stages. In some embodiments, liquid applied roofing formulation is applied to the at least one steep slope roof substrate in four stages. In some embodiments, liquid applied roofing formulation is applied to the at least one steep slope roof substrate in five stages. In some embodiments, liquid applied roofing formulation is applied to the at least one steep slope roof substrate in ten stages.

In some embodiments, applying the liquid applied roofing formulation to at least one steep slope roof substrate is performed using at least one applicator device. In some embodiments, the at least one applicator device is at least one spraying device. In some embodiments, the liquid applied roofing formulation is applied as two component streams. In some embodiments, a first component stream comprises the base formulation and a second component stream comprises the activator formulation. In some embodiments, the first stream and the second stream are applied to the at least one steep slope roof substrate sequentially. In some embodiments, the first stream and the second stream are applied to the at least one steep slope roof substrate simultaneously. In some embodiments, the liquid applied roofing formulation may be applied to the at least one steep slope roof substrate using existing commercial spraying equipment.

In some embodiments, the method of using the liquid applied roofing formulation further comprises solidifying the formulation. In some embodiments, solidifying the formulation comprises curing the formulation, drying the formulation, or any combination thereof.

In some embodiments, the liquid applied roofing formulation may solidify in less than 1 hour. In some embodiments, the liquid applied roofing formulation may solidify in less than 30 minutes. In some embodiments, the liquid applied roofing formulation may solidify in less than 15 minutes.

In some embodiments, solidifying the formulation forms at least one coating layer on the at least one steep slope roof substrate.

In some embodiments, the at least one coating layer has a thickness of 1 mil to 100 mil. In some embodiments, the at least one coating layer has a thickness of 10 mil to 100 mil. In some embodiments, the at least one coating layer has a thickness of 20 mil to 100 mil. In some embodiments, the at least one coating layer has a thickness of 30 mil to 100 mil. In some embodiments, the at least one coating layer has a thickness of 40 mil to 100 mil. In some embodiments, the at least one coating layer has a thickness of 50 mil to 100 mil. In some embodiments, the at least one coating layer has a thickness of 60 mil to 100 mil. In some embodiments, the at least one coating layer has a thickness of 70 mil to 100 mil. In some embodiments, the at least one coating layer has a thickness of 80 mil to 100 mil. In some embodiments, the at least one coating layer has a thickness of 90 mil to 100 mil.

In some embodiments, the at least one coating layer has a thickness of 1 mil to 90 mil. In some embodiments, the at least one coating layer has a thickness of 1 mil to 80 mil. In some embodiments, the at least one coating layer has a thickness of 1 mil to 70 mil. In some embodiments, the at least one coating layer has a thickness of 1 mil to 60 mil. In some embodiments, the at least one coating layer has a thickness of 1 mil to 50 mil. In some embodiments, the at least one coating layer has a thickness of 1 mil to 40 mil. In some embodiments, the at least one coating layer has a thickness of 1 mil to 30 mil. In some embodiments, the at least one coating layer has a thickness of 1 mil to 20 mil. In some embodiments, the at least one coating layer has a thickness of 1 mil to 10 mil.

In some embodiments, the at least one coating layer has a thickness of 10 mil to 90 mil. In some embodiments, the at least one coating layer has a thickness of 20 mil to 80 mil. In some embodiments, the at least one coating layer has a thickness of 30 mil to 70 mil. In some embodiments, the at least one coating layer has a thickness of 40 mil to 60 mil.

In some embodiments, the at least one coating layer has a thickness of 20 mil to 40 mil. In some embodiments, the at least one coating layer has a thickness of 25 mil to 40 mil. In some embodiments, the at least one coating layer has a thickness of 30 mil to 40 mil. In some embodiments, the at least one coating layer has a thickness of 35 mil to 40 mil.

In some embodiments, the at least one coating layer has a thickness of 20 mil to 35 mil. In some embodiments, the at least one coating layer has a thickness of 20 mil to 30 mil. In some embodiments, the at least one coating layer has a thickness of 20 mil to 25 mil.

In some embodiments, the at least one coating layer has a thickness of 25 mil to 35 mil.

In some embodiments, the at least one coating layer, as applied to the at least one steep slope roof substrate, passes the Class A UL790 fire test requirement.

In some embodiments, the at least one coating layer, as applied to the at least one steep slope roof substrate, passes the ASTM D1970 nail sealability test.

In some embodiments, only a single coating layer is present on the at least one steep slope roof substrate.

In some embodiments, the single coating layer has a thickness of 1 mil to 100 mil. In some embodiments, the single coating layer has a thickness of 10 mil to 100 mil. In some embodiments, the single coating layer has a thickness of 20 mil to 100 mil. In some embodiments, the single coating layer has a thickness of 30 mil to 100 mil. In some embodiments, the single coating layer has a thickness of 40 mil to 100 mil. In some embodiments, the single coating layer has a thickness of 50 mil to 100 mil. In some embodiments, the single coating layer has a thickness of 1 mil to 100 mil. In some embodiments, the single coating layer has a thickness of 60 mil to 100 mil. In some embodiments, the single coating layer has a thickness of 70 mil to 100 mil. In some embodiments, the single coating layer has a thickness of 80 mil to 100 mil. In some embodiments, the single coating layer has a thickness of 90 mil to 100 mil.

In some embodiments, the single coating layer has a thickness of 1 mil to 90 mil. In some embodiments, the single coating layer has a thickness of 1 mil to 80 mil. In some embodiments, the single coating layer has a thickness of 1 mil to 70 mil. In some embodiments, the single coating layer has a thickness of 1 mil to 60 mil. In some embodiments, the single coating layer has a thickness of 1 mil to 50 mil. In some embodiments, the single coating layer has a thickness of 1 mil to 40 mil. In some embodiments, the single coating layer has a thickness of 1 mil to 30 mil. In some embodiments, the single coating layer has a thickness of 1 mil to 20 mil. In some embodiments, the single coating layer has a thickness of 1 mil to 10 mil.

In some embodiments, the single coating layer has a thickness of 10 mil to 90 mil. In some embodiments, the single coating layer has a thickness of 20 mil to 80 mil. In some embodiments, the single coating layer has a thickness of 30 mil to 70 mil. In some embodiments, the single coating layer has a thickness of 40 mil to 60 mil.

In some embodiments, the single coating layer has a thickness of 20 mil to 40 mil. In some embodiments, the single coating layer has a thickness of 25 mil to 40 mil. In some embodiments, the single coating layer has a thickness of 30 mil to 40 mil. In some embodiments, the single coating layer has a thickness of 35 mil to 40 mil.

In some embodiments, the single coating layer has a thickness of 20 mil to 35 mil. In some embodiments, the single coating layer has a thickness of 20 mil to 30 mil. In some embodiments, the single coating layer has a thickness of 20 mil to 25 mil.

In some embodiments, the single coating layer has a thickness of 25 mil to 35 mil.

In some embodiments, multiple coating layers are present on the at least one steep slope roof substrate. In some embodiments, at least two coating layers are present on the at least one steep slope roof substrate. In some embodiments, at least three coating layers are present on the at least one steep slope roof substrate. In some embodiments, at least four coating layers are present on the at least one steep slope roof substrate. In some embodiments, at least five coating layers are present on the at least one steep slope roof substrate. In some embodiments, at least ten coating layers are present on the at least one steep slope roof substrate. In some embodiments, at least twenty coating layers are present on the at least one steep slope roof substrate. In some embodiments, at least fifty coating layers are present on the at least one steep slope roof substrate. In some embodiments, at least one-hundred coating layers are present on the at least one steep slope roof substrate.

In some embodiments, the at least one coating layer, as applied to the at least one steep slope roof substrate, may be walkable within 3 to 5 hours. In some embodiments, the at least one coating layer, as applied to the at least one steep slope roof substrate, may be walkable within 3 to 4 hours. In some embodiments, the at least one coating layer, as applied to the at least one steep slope roof substrate, may be walkable within 4 to 5 hours.

In some embodiments, the at least one coating layer may conform to an irregular profile on the at least one steep slope roof substrate. In some embodiments, the at least one coating layer may function as an underlayment a leak barrier, or any combination thereof. In some embodiments, the at least one coating layer may provide full coverage of the at least one steep slope roof substrate. In some embodiments, the at least one coating layer, as applied herein, may be "retrofit" to an existing steep slope roof substrate. In some embodiments, the at least one coating layer, as applied to the at least one steep slope roof substrate, may exhibit improved breathability. In some embodiments, the at least one coating layer, as applied to the at least one steep slope roof substrate, may not need to be covered immediately during an existing project, due to the improved solidifying time described herein.

Some embodiments of the present disclosure relate to the liquid applied roofing formulation. In some embodiments, the liquid applied roofing formulation comprises a first part and a second part. In some embodiments, the liquid applied roofing formulation consists of a first part and a second part. In some embodiments, the liquid applied roofing formulation consists essentially of a first part and a second part.

In some embodiments, the first part of the liquid applied roofing formulation comprises the base formulation described herein. In some embodiments, the first part of the liquid applied roofing formulation consists essentially of the base formulation described herein. In some embodiments, the first part of the liquid applied roofing formulation consists of the base formulation described herein.

In some embodiments, the base formulation comprises the at least one flame retardant, the at least one acrylic polymer, and water. In some embodiments, the base formulation consists of the at least one flame retardant, the at least one acrylic polymer, and water. In some embodiments, the base formulation consists essentially of the at least one flame retardant, the at least one acrylic polymer, and water.

In some embodiments, the second part of the liquid applied roofing formulation comprises the activator formulation described herein. In some embodiments, the second part of the liquid applied roofing formulation consists of the activator formulation described herein. In some embodiments, the second part of the liquid applied roofing formulation consists essentially of the activator formulation described herein.

In some embodiments, the liquid applied roofing formulation has three parts. In some embodiments, the liquid applied roofing formulation has four parts. In some embodiments, the liquid applied roofing formulation has five parts. In some embodiments, the liquid applied roofing formulation has ten parts. In some embodiments, the liquid applied roofing formulation has twenty parts.

In some embodiments, any additional parts (i.e., in excess of the first part and the second part) of the liquid applied roofing formulation may be the same as the first part, same as the second part, different from the first part, different from the second part, include common components with the first part, include common components with the second part, include no common components with the first part, include no common components with the second part, or any combination thereof.

In some embodiments, application of a single coat of the liquid applied roofing formulation to the at least one steep slope roof substrate and solidification of the single coat of the liquid applied roofing formulation on the at least one steep slope roof substrate, results in the formation of the single coating layer on the steep slope roof substrate.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim. In some embodiments, a claim reciting "consisting essentially of" may include any unrecited component(s) or steps(s) that do(es) not alter at least one of the following properties such as but not limited to: viscosity, ASTM D1970 nail sealability, Class A UL790 fire resistance, or any combination thereof.

As used herein, terms such as "consisting of" and "composed of" limit the scope of a specific claim to the materials and steps recited by the claim.

EXAMPLES

Example 1: The following four non-limiting exemplary base formulations 1 to 4 (first parts) shown below in Tables 1A to 1D were prepared.

TABLE 1A

Base Formulation 1

| Component | Weight % |
| --- | --- |
| Water | 12.7% |
| Polyol Coalescent | 0.5% |
| Acrylic Acid Sodium Salt | 0.4% |
| Potassium tripolyphosphate (KTPP) | 0.1% |
| White $CaCO_3$ | 5.7% |
| Aluminum Hydroxide (ATH) | 17% |
| Ammonia | 0.1% |
| Acrylic Resin | 49.8% |
| Industrial Biocide | 0.1% |
| Industrial Biocide (dry film) | 0.5% |
| Expandable Graphite | 13% |
| Acrylic Thickener | 0.1% |

TABLE 1B

Base Formulation 2

| Component | Weight % |
| --- | --- |
| Water | 12.7% |
| Polyol Coalescent | 0.5% |
| Acrylic Acid Sodium Salt | 0.4% |
| KTPP | 0.1% |
| White $CaCO_3$ | 10.7% |
| ATH | 11% |
| Ammonia | 0.1% |
| Acrylic Resin | 49.8% |
| Industrial Biocide | 0.1% |
| Industrial Biocide (dry film) | 0.5% |
| Expandable Graphite | 14% |
| Acrylic Thickener | 0.1% |

TABLE 1C

Base Formulation 3

| Component | Weight % |
|---|---|
| Water | 12.6% |
| Polyol Coalescent | 0.5% |
| Acrylic Acid Sodium Salt | 0.4% |
| KTPP | 0.1% |
| White $CaCO_3$ | 10.7% |
| ATH | 15% |
| Ammonia | 0.1% |
| Acrylic Resin | 49.8% |
| Industrial Biocide | 0.1% |
| Industrial Biocide (dry film) | 0.5% |
| Expandable Graphite | 10% |
| Acrylic Thickener | 0.2% |

TABLE 1D

Base Formulation 4

| Component | Weight % |
|---|---|
| Water | 12.6% |
| Polyol Coalescent | 0.5% |
| Acrylic Acid Sodium Salt | 0.4% |
| Potassium tripolyphosphate (KTPP) | 0.1% |
| White $CaCO_3$ | 13.7% |
| Aluminum Hydroxide (ATH) | 15% |
| Ammonia | 0.1% |
| Acrylic Resin | 49.8% |
| Industrial Biocide | 0.1% |
| Industrial Biocide (dry film) | 0.5% |
| Expandable Graphite | 7% |
| Acrylic Thickener | 0.2% |

Example 2: Exemplary non-limiting activator formulations (second parts) were also prepared. The activator formulation included 45-55 wt % of an inorganic salt (aluminum sulfate) in water.

Example 3: Liquid applied roofing formulations were also prepared based on the base formulations presented in Example 1 and the activator formulations presented in Example 2.

The activator formulation was combined with Base Formulation 2 (Table 1B above) in a weight ratio of 1:20 to 3:20 to result in Liquid Applied Roofing Formulation 1.

The activator formulation was combined with Base Formulation 3 (Table 1C above) in a weight ratio of 1:20 to 3:20 to result in Liquid Applied Roofing Formulation 2.

Example 4: Two comparative formulations (Comparative Formulations 1 and 2) were also obtained. Each comparative formulation was a liquid flashing formulation that was commercially obtained from DOW®. Each comparative formulation included ≤40% limestone, ≤40% acrylic polymers, ≤30% water, ≤5% propylene glycol and ≤1.5% titanium dioxide.

Example 5: Viscosities of the Liquid Applied Roofing Formulations 1 and 2 and Comparative Formulations 1 and 2 were measured in accordance with ASTM D2196 at 23° C. Liquid Applied Roofing Formulations 1 and 2 were measured using a RV3 viscometer spindle at 50 rpm. Comparative Formulations 1 and 2 were measured using a RV7 viscometer spindle at 23 rpm.

Results are shown in Table 2 below.

TABLE 2

Exemplary Viscosities of Liquid Applied Roofing Formulations 1 and 2 and Comparative Formulations 1 and 2:

| Test | Method | Units | Liquid Applied Roofing Formulation 1 | Liquid Applied Roofing Formulation 2 | Comparative Formulation 1 | Comparative Formulation 2 |
|---|---|---|---|---|---|---|
| Viscosity (RV-7 @ 23 rpm) | ASTM D2196 | cP | — | — | 38,600 | 49,230 |
| Viscosity (RV-3 @ 50 rpm) | ASTM D2196 | cP | 346 | 468 | — | — |

Example 6: Liquid Applied Roofing Formulations 1 and 2 and Comparative Formulations 1 and 2 from Example 1 were applied in a single pass to sample roof substrate, so as to form a coating layer on each sample roof substrate. Each coating layer was applied at a target thickness of 30 mil.

The sample roof substrates were tested for nail sealability under ASTM D1970. Results are shown below in Table 3.

TABLE 3

Nail Sealability Data Per ASTM D1970

| Sample Roof Substrate | Applied Formulation | Number of Samples | Passing Rate, % |
|---|---|---|---|
| Comparative Roof Substrate 1 | Comparative Formulation 1 | 4 | 75 |
| Comparative Roof Substrate 2 | Comparative Formulation 2 | 4 | 50 |
| Sample Roof Substrate 1 | Liquid Applied Roofing Formulation 1 | 2 | 100 |
| Sample Roof Substrate 2 | Liquid Applied Roofing Formulation 2 | 2 | 100 |

Example 7: The sample roof substrates were also tested for fire resistance using a modified version of the Class A UL790 fire test. The modified Class A UL790 fire test was a lab-scale test using a flame tube. The results of the lab-scale test were correlated to the Class A UL790 test to demonstrate whether the samples would pass the Class A UL 790 Test, if conducted. Results of the correlated Class A UL 790 Test are shown below in Table 4.

TABLE 4

Lab Scale Flame Tube Test Results Correlated to the Class A UL790 Test

| Sample Roof Substrate | Applied Formulation | Number of Samples | Result |
|---|---|---|---|
| Comparative Roof Substrate 1 | Comparative Formulation 1 | 2 | fail |
| Comparative Roof Substrate 2 | Comparative Formulation 2 | 2 | fail |
| Sample Roof Substrate 1 | Liquid Applied Roofing Formulation 1 | 2 | pass |
| Sample Roof Substrate 2 | Liquid Applied Roofing Formulation 2 | 2 | pass |

Example 8:

Two additional non-limiting base formulations (Base Formulations 5 and 6) were prepared. Base Formulations 5 and 6 are shown below in Tables 4A to 4B.

TABLE 4A

Base formulation 5

| Component | Weight % |
|---|---|
| Water | 19.9% |
| Polyol Coalescent | 0.5% |
| Acrylic Acid Sodium Salt | 0.4% |
| Potassium tripolyphosphate (KTPP) | 0.1% |
| White $CaCO_3$ | 11% |
| Aluminum Hydroxide (ATH) | 0.1% |
| Ammonia | 53.3% |
| Acrylic Resin | 0.1% |
| Industrial Biocide | 0.5% |
| Industrial Biocide (dry film) | 14% |
| Graphite | 0.1% |

TABLE 4B

Base formulation 6

| Component | Weight % |
|---|---|
| Water | 19.9% |
| Polyol Coalescent | 0.4% |
| Acrylic Acid Sodium Salt | 0.4% |
| Potassium tripolyphosphate (KTPP) | 0.1% |
| White $CaCO_3$ | 15% |
| Aluminum Hydroxide (ATH) | 0.1% |
| Ammonia | 53.3% |
| Acrylic Resin | 0.1% |
| Industrial Biocide | 0.5% |
| Industrial Biocide (dry film) | 10% |
| Graphite | 0.2% |

Example 9: Activator formulations that included 45-55 wt % of an inorganic salt (aluminum sulfate) in water were combined with Base Formulations 5 to 6 in weight ratios ranging from 1:20 to 3:20 to result in two additional liquid applied roofing formulations (Liquid Applied Roofing Formulations 3 and 4). That is, the activator formulation was combined with Base Formulation 5 in a weight ratio of 1:20 to 3:20 to result in Liquid Applied Roofing Formulation 3; and the activator formulation was combined with Base Formulation 6 in a weight ratio of 1:20 to 3:20 to result in Liquid Applied Roofing Formulation 4. Liquid Applied Roofing Formulations 3 and 4 were sprayed directly in a single pass to sample roof substrates (each in the form of a roof deck), so as to form a coating layer on each sample roof substrate. Each coating layer was applied at a target thickness of 60 mil. Fire resistance tests as per Class A UL790 were conducted at UL. The sample roof substrates all passed the Class A UL790 fire resistance tests (100% passing rate).

All prior patents, publications, and test methods referenced herein are incorporated by reference in their entireties. Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A system comprising:
   at least one steep slope roof substrate,
   an underlayment on the at least one steep slope roof substrate,
       wherein the underlayment is a cured coating layer,
           wherein the cured coating layer comprises:
               at least one flame retardant,
               at least one crosslinked acrylic polymer, and
               water.

2. The system of claim 1, wherein the at least one steep slope roof substrate is a roof deck.

3. The system of claim 1, wherein the underlayment has a thickness of 1 mil to 100 mil.

4. The system of claim 1, wherein the at least one flame retardant is present in an amount of 1 wt % to 60 wt % based on a total weight of the cured coating layer.

5. The system of claim 1, wherein the at least one flame retardant comprises at least one of colemanite, aluminum trihydrate (ATH), magnesium hydroxide, expandable graphite, ammonium polyphosphate, triphenyl phosphate, resorcinol bis(diphenylphosphate), bisphenol A diphenyl phosphate, tricresyl phosphate, dimethyl methylphosphonate, aluminium diethyl phosphinate, decabromodiphenyl ether, decabromodiphenyl ethane, at least one brominated polystyrene, at least one brominated carbonate oligomer, at least one brominated epoxy oligomer, tetrabromophthalic anhydride, tetrabromobisphenol A, hexabromocyclododecane, antimony trioxide, antimony pentoxide, at least one chlorinated paraffin, huntite, hydromagnesite, red phosphorous, zinc borate, sodium borate, lithium borate, boric acid, tris (1,3-dichloro-2-propyl)phosphate, tetrakis(2-chloroethyl)dichloroisopentyl diphosphate, or any combination thereof.

6. The system of claim 1, wherein the at least one crosslinked acrylic polymer is present in the cured coating layer in an amount of 1 wt % to 60 wt % based on a total weight of the cured coating layer.

7. The system of claim 1, wherein the at least one crosslinked acrylic polymer comprises at least one of poly (methyl methacrylate) (PMMA), polyacrylonitrile (PAN), poly(hydroxyethyl methacrylate), poly(glyceryl methacrylate), poly(ethyl methacrylate), poly(isobutyl methacrylate), poly(acrylic acid), poly($\alpha$-methyl cyanoacrylate), an acrylic latex resin, acrylic-polyvinyl chloride (acrylic-PVC), acrylic-styrene, isobornyl methacrylate, isobornyl acrylate, ethyl methacrylate, isobutyl methacrylate, n-butyl methacrylate, ethyl acrylate, n-butyl acrylate, 2-hexyl ethyl acrylate, or any combination thereof.

8. The system of claim 1, wherein the cured coating layer further comprises at least one pigment, at least one desiccant, at least one film formation additive, at least one filler, at least one rheology modifier, at least one crosslinker, at least one flocculating agent, or any combination thereof.

* * * * *